(12) United States Patent
Gaddam et al.

(10) Patent No.: US 12,062,039 B2
(45) Date of Patent: *Aug. 13, 2024

(54) DIGITAL ASSET DISTRIBUTION BY TRANSACTION DEVICE

(71) Applicant: Visa International Service Association, San Francisco, CA (US)

(72) Inventors: Sivanarayana Gaddam, Santa Clara, CA (US); Gyan Prakash, Foster City, CA (US); John Arendt, San Mateo, CA (US)

(73) Assignee: Visa International Service Association, San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/172,216

(22) Filed: Feb. 21, 2023

(65) Prior Publication Data

US 2023/0206217 A1     Jun. 29, 2023

Related U.S. Application Data

(62) Division of application No. 16/300,689, filed as application No. PCT/US2016/042653 on Jul. 15, 2016, now Pat. No. 11,651,352.

(51) Int. Cl.
    *G06Q 20/36*     (2012.01)
    *G06Q 20/04*     (2012.01)
    (Continued)

(52) U.S. Cl.
    CPC ......... *G06Q 20/3672* (2013.01); *G06Q 20/04* (2013.01); *G06Q 20/065* (2013.01);
    (Continued)

(58) Field of Classification Search
    CPC ............ G06Q 20/3672; G06Q 20/356; G06Q 20/4018; G06Q 2220/00
    (Continued)

(56) References Cited

U.S. PATENT DOCUMENTS 7,334,724 B2    2/2008    Pallares
8,577,805 B1    11/2013    Oakes, III et al.
(Continued)

FOREIGN PATENT DOCUMENTS

CN           1430760 A     7/2003
CN          102160069 A     8/2011
(Continued)

OTHER PUBLICATIONS

Application No. SG11201809112V, Notice of Decision to Grant, Mailed On Mar. 23, 2023, 5 pages.
(Continued)

*Primary Examiner* — Courtney P Jones
(74) *Attorney, Agent, or Firm* — Kilpatrick Townsend & Stockton LLP

(57) ABSTRACT

A user can associate a digital asset corresponding to a value with a transaction device to be used by another user. For example, a first user can load a digital asset corresponding to a cryptocurrency amount onto a transaction device, where the first user then provides the transaction device to a second user. The second user can utilize the cryptocurrency amount on the transaction device to conduct a transaction. The generation and use of digital assets can be managed using ledgers that store data in the form of block chains.

12 Claims, 7 Drawing Sheets

(51) Int. Cl.
*G06Q 20/06* (2012.01)
*G06Q 20/10* (2012.01)
*G06Q 20/34* (2012.01)
*G06Q 20/38* (2012.01)
*G06Q 20/40* (2012.01)

(52) U.S. Cl.
CPC ......... *G06Q 20/105* (2013.01); *G06Q 20/356* (2013.01); *G06Q 20/36* (2013.01); *G06Q 20/386* (2020.05); *G06Q 20/4018* (2013.01); *G06Q 2220/00* (2013.01)

(58) Field of Classification Search
USPC .......................................................... 705/66
See application file for complete search history.

(56) References Cited

U.S. PATENT DOCUMENTS

| | | | |
|---|---|---|---|
| 10,915,895 | B1 | 2/2021 | Fogg |
| 2008/0046362 | A1 | 2/2008 | Easterly |
| 2012/0011016 | A1 | 1/2012 | Williams et al. |
| 2014/0214640 | A1* | 7/2014 | Mallikarjunan ..... G06Q 20/322 705/35 |
| 2015/0046337 | A1 | 2/2015 | Hu et al. |
| 2015/0066748 | A1 | 3/2015 | Winslow et al. |
| 2015/0081566 | A1 | 3/2015 | Slepinin |
| 2015/0206106 | A1 | 7/2015 | Yago |
| 2015/0262173 | A1 | 9/2015 | Durbin et al. |
| 2015/0324764 | A1* | 11/2015 | Van Rooyen ......... G06Q 20/02 705/69 |
| 2015/0363770 | A1 | 12/2015 | Ronca et al. |
| 2015/0363778 | A1 | 12/2015 | Ronca et al. |
| 2015/0371224 | A1 | 12/2015 | Lingappa |
| 2016/0292680 | A1 | 10/2016 | Wilson et al. |
| 2016/0321434 | A1 | 11/2016 | McCoy et al. |
| 2016/0321663 | A1* | 11/2016 | Batlle ................. G06Q 20/405 |
| 2017/0011392 | A9 | 1/2017 | Lingham et al. |
| 2017/0053249 | A1 | 2/2017 | Tunnell et al. |
| 2017/0200147 | A1* | 7/2017 | Ansari ................ G06Q 20/381 |
| 2017/0230375 | A1* | 8/2017 | Kurian ................ G06Q 20/382 |
| 2017/0236121 | A1 | 8/2017 | Lyons et al. |
| 2017/0249622 | A1* | 8/2017 | Ortiz .................. H04L 63/0428 |
| 2017/0262841 | A1 | 9/2017 | Good et al. |
| 2017/0323294 | A1* | 11/2017 | Rohlfing ............... H04L 9/3239 |
| 2019/0139047 | A1 | 5/2019 | Ronnow et al. |

FOREIGN PATENT DOCUMENTS

| | | | |
|---|---|---|---|
| CN | 105678546 A | * 6/2016 | ............ G06Q 20/28 |
| CN | 105678546 A | 6/2016 | |
| KR | 101628624 B1 | 6/2016 | |
| WO | 2012090074 A2 | 7/2012 | |

OTHER PUBLICATIONS

Application No. CN201680087704.4, Office Action, Mailed On May 24, 2023, with English Translation, 17 pages.
Application No. CN201680087704.4, Office Action, Mailed On Nov. 1, 2022, 18 pages.
Application No. EP16909037.0, Extended European Search Report, Mailed On Jun. 21, 2019, 9 pages.
Application No. EP16909037.0, Office Action, Mailed On Feb. 9, 2021, 8 pages.
Application No. PCT/US2016/042653, International Search Report and Written Opinion, Mailed On Apr. 14, 2017, 12 pages.
Application No. SG11201809112V, Further Written Opinion, Mailed On Sep. 15, 2021, 7 pages.
Application No. SG11201809112V, Written Opinion, Mailed On Mar. 10, 2020, 6 pages.
Application No. CN201680087704.4, Office Action, Mailed On Sep. 28, 2023, with English Translation, 14 pages.

\* cited by examiner

DIGITAL ASSET DISTRIBUTION BY TRANSACTION DEVICE

CROSS-REFERENCE TO RELATED APPLICATIONS

This application is a divisional of U.S. patent application Ser. No. 16/300,689, filed Nov. 12, 2018, which is a 371 National Phase of International Application No. PCT/US2016/042653, filed Jul. 15, 2016, the disclosures of which are incorporated by reference herein in their entireties.

BACKGROUND

A user may want to perform a distribution process (e.g., for wages, goods, data, etc.) with other users. However, it is difficult to conduct the distribution process securely if these other users do not have any relationship with an entity that oversees the distribution process. For example, the other users may not have a registered account hosted by the entity. Typically, such an account can indicate that a user can be trusted because the entity has already conducted an authentication process for the user. As a result, the user that distributes wages, goods, or data to these other users that do not have accounts performs the distribution process without sufficient security.

Embodiments of the present invention address these and other problems, individually and collectively.

BRIEF SUMMARY

One embodiment of the present invention is related to a method performed by a service provider computer. The service provider computer may receive, from a computing device of a first user, a request to generate a digital asset. The service provider computer can then generate the digital asset and may activate the digital asset with respect to a transaction device to be provided to a second user. In some embodiments, activating the digital asset with respect to the transaction device comprises associating a digital asset identifier and a value corresponding to the digital asset with the transaction device. In some cases, the transaction device may be a card.

The service provider computer can then send a request to update a first unalterable electronic ledger to indicate the association of the digital asset with the transaction device. In some embodiments, the request to update the first unalterable electronic ledger may be sent to a first financial institution computer, wherein the first financial institution computer can update the first unalterable electronic ledger. The service provider computer may receive an indication that the second user utilized the transaction device to conduct a transaction and can then send a request to update a second unalterable electronic ledger to indicate the use of the digital asset by the second user. In some embodiments, the request to update the second unalterable electronic ledger may be sent to a second financial institution computer, wherein the second financial institution computer can update the second unalterable electronic ledger. In some embodiments, the service provider computer may also send a request to update the first unalterable electronic ledger to indicate the user of the digital asset by the second user. In some cases, the first unalterable electronic ledger and the second unalterable electronic ledger may each be in the form of a block chain.

In some embodiments, the service provider computer may perform additional steps, which may be performed prior to the second user utilizing the transaction device. The service provider computer may receive, from the computing device, a request to associate the transaction device with a transaction device identifier. The service provider computer can then generate the transaction device identifier and may associate the transaction device with the transaction device identifier. In some embodiments, a reader device that is in communication with the computing device may provision the transaction device with the transaction device identifier.

Another embodiment of the present invention is related to a method performed by a computing device. The computing device can receive, from a first user, a request to generate a digital asset. The computing device may then send the request to a service provider computer, which can generate the digital asset. The computing device may then initiate activation of the digital asset with respect to a transaction device to be provided to a second user. The service provider computer may send a request to update a first unalterable electronic ledger to indicate the association of the digital asset with the transaction device. The second user may utilize the transaction device to conduct a transaction and the service provider computer may send a request to update a second unalterable electronic ledger to indicate the user of the digital asset by the second user.

Another embodiment of the present invention is related to a service provider computer. The service provider computer may comprise a processor and a computer readable medium coupled to the processor. The computer readable medium can comprise code, executable by the processor, to implement methods described herein.

Another embodiment of the present invention is related to a computing device. The computing device may comprise a processor and a computer readable medium coupled to the processor. The computer readable medium can comprise code, executable by the processor, to implement methods described herein.

These and other embodiments of the invention are described in further detail below.

DETAILED DESCRIPTION

Figure 1:
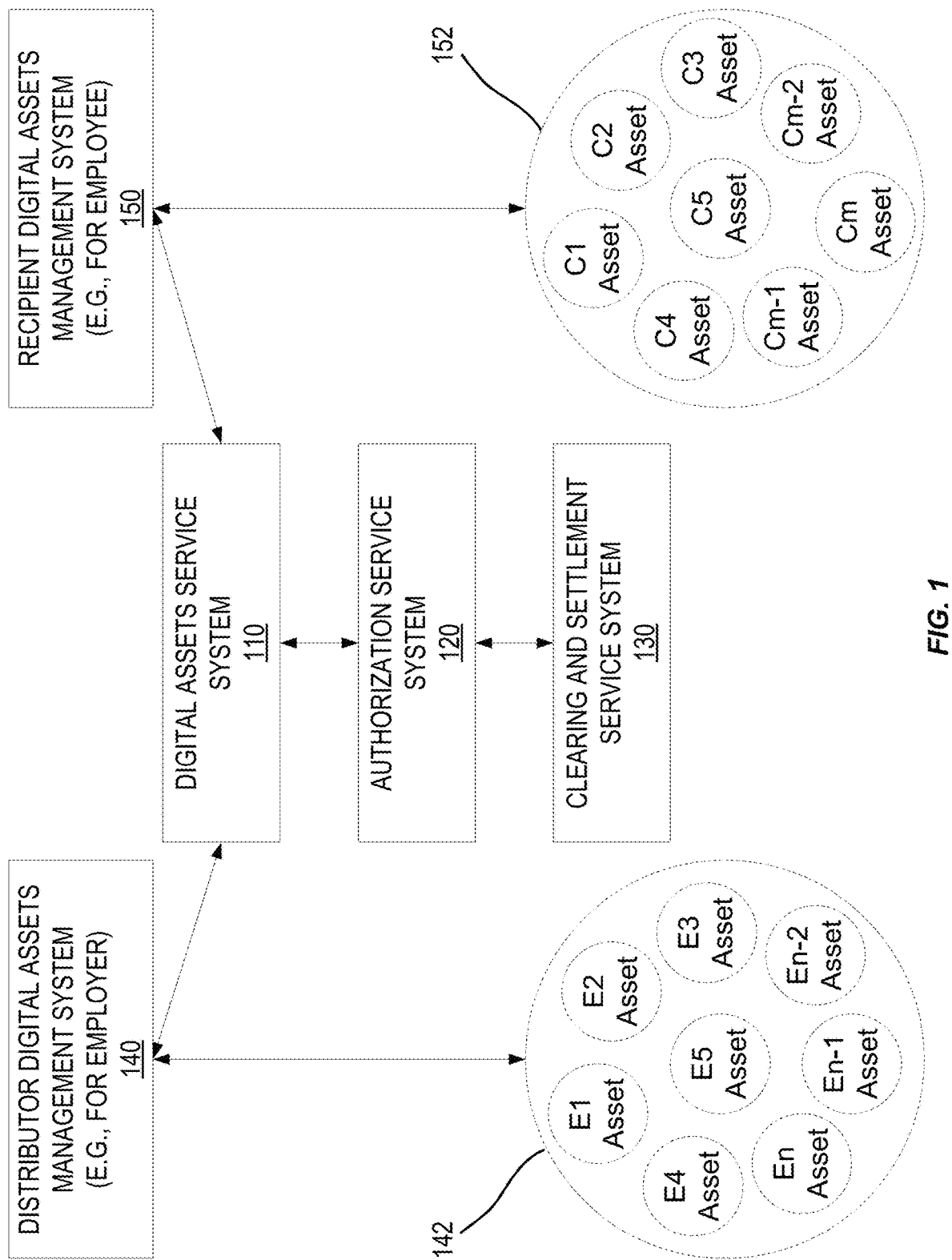
FIG. 1 shows a block diagram showing a digital asset distribution system according to embodiments of the invention.

Prior to discussing embodiments of the invention, descriptions of some terms may be helpful in providing a better understanding of the invention.

"Digital currency" may refer to units of value that may be used as a form of payment for transactions, including financial transactions. Digital currency may be currency that is electronically generated by and stored within a user computing device. Digital currency may be purchased using conventional forms of currency (e.g., fiat currency) and generated with a specific value. Typically, the digital currency may not have a physical form of tender but may be accessible through a user computing device (e.g., mobile device) using a software application such as a digital wallet or mobile application. A type of digital currency may be cryptocurrency, which utilizes cryptographic methods for verification.

A "digital asset" may refer to digital content associated with a value. In some cases, the digital asset may also indicate a right to use the value and other attributes associated with the digital asset. For example, a digital asset may be data that indicates a digital currency value, such as a cryptocurrency value. The digital asset may also indicate a plurality of digital asset attributes, such as a bank identification number (BIN) identifier, a digital asset identifier, a timestamp, an acquirer public key, a resource provider identifier, and resource provider location. In other embodiments, the digital asset may correspond to other non-currency values, such as access privileges data (e.g., number of authorized usages) and time limit data.

A "user" may refer to an entity that can perform transactions. In some embodiments, the user may be an entity involved in digital assets transactions. One type of user is a distributing user. A distributing user may provide instructions for generation and distribution of digital assets. The distributing user may distribute digital assets by activating them with respect to transaction devices that are to be utilized by recipient users. A recipient user is a user that may utilize a transaction device associated with a digital asset distributed by a distributing user to conduct transactions. The recipient user may use the digital asset by using the transaction device associated with the digital asset. In some exemplary cases, the distributing user and recipient user may be an employer and an employee, a parent and a child, or a manager and team member, respectively.

A "cryptocurrency payment network" may refer to one or more server computers that function to operate and maintain a cryptocurrency system. The cryptocurrency payment network may function to facilitate the generation/issuance and distribution of digital currency between devices within the cryptocurrency payment network. The cryptocurrency payment network may also function to enable the performance of transactions between devices for the transfer or goods/services and/or the transfer of funds. The cryptocurrency payment network may operate nodes that manage a ledger of transactions. In some embodiments, the cryptocurrency payment network may also be known as a digital assets payment network.

A "ledger of transactions" may refer to a compilation of data from previous transactions. The ledger of transactions may be a database or other comparable file structure that may be configured to store data from all previous transactions performed using a digital currency, including the date and time of the transaction, the transaction amount, and identification information for the participants of the transaction (e.g., the sender and the receiver of the transaction amount). In some embodiments, the ledger of transactions may be unalterable electronic ledgers, which may be in the form of block chains. In some embodiments, each node within a cryptocurrency payment network may store their own copy of the ledger of transactions. In other embodiments, only some nodes may store their own copy of the ledger of transactions.

An "issuer node" may be a device or module that enables management of the creation and issuance of digital assets. In some embodiments, the issuer node may be operated by a server computer (e.g., financial institution computer), which may utilize the issuer node to generate a digital asset.

A "manager node" may be a device or module that enables management of digital assets utilized by users. The digital assets utilized by users may be those that are activated with respect to a transaction device. In some embodiments, the manager node may be operated by a server computer (e.g., financial institution computer), which may submit data to the manager node to update ledgers of transactions.

A "digital signature" may refer to an electronic signature for a message. In some embodiments, the digital signature may be used to validate the authenticity of a transaction message sent within a cryptocurrency payment network. A digital signature may be a unique value generated from a message and a private key using an encrypting algorithm. In some embodiments, a verification algorithm using a public key may be used to verify the signature. The digital signature may be a numeric value, an alphanumeric value, or any other type of data including a graphical representation.

A "key" may refer to a piece of data or information used for an algorithm. A key may be a unique piece of data and is typically part of a key pair where a first key may be used to encrypt a message, while a second key may be used to decrypt the encrypted message. The key may be a numeric or alphanumeric value and may be generated using an algorithm. A management system server computer in a cryptocurrency payment network may generate and assign a unique key pair for each node in the cryptocurrency payment network.

A key pair may include a public key and a private key. The key pair may be used by nodes and/or payment entities to conduct transactions in the cryptocurrency payment network. The key pair may be generated by a server computer associated with the cryptocurrency payment network or may be generated by a financial institution server computer for a payment entity when an account with the financial institution server computer is created. The public key may be distributed throughout the cryptocurrency payment network in order to allow for verification of payment transaction messages signed using the corresponding private key.

A "financial institution server computer" may refer to a computer associated with a financial institution (e.g., bank). Examples of financial institution server computers may include an access device, terminal, or a web server computer hosting a financial institution server Internet website.

A "resource providing entity" may be an entity that may make resources available to a user. A resource providing entity may also be known as a resource provider. Examples of resource providing entities include distributors, merchants, vendors, suppliers, owners, traders, and the like. In some embodiments, such entities may be a single individual, small groups of individuals, or larger groups of individuals (e.g., companies). Resource providing entities may be associated with one or more physical locations (e.g., supermarkets, malls, stores, etc.) and online platforms (e.g., e-commerce websites, online companies, etc.). At the physical locations, the resource providing entity may host an access device. In some embodiments, resource providing entities may make available physical items (e.g., goods, products, appliances, etc.) to the user. In other embodiments, resource providing entities may make available digital resources (e.g., electronic documents, electronic files, etc.) or time (e.g., rental time, use time, etc.) to the user. In other embodiments, resource providing entities may manage access to certain resources by the user.

A "server computer" may include a powerful computer or cluster of computers. For example, the server computer can be a large mainframe, a minicomputer cluster, or a group of servers functioning as a unit. In one example, the server computer may be a database server coupled to a Web server. The server computer may be coupled to a database and may include any hardware, software, other logic, or combination of the preceding for servicing the requests from one or more client computers. The server computer may comprise one or more computational apparatuses and may use any of a variety of computing structures, arrangements, and compilations for servicing the requests from one or more client computers.

A "computing device" may refer to an electronic device that is associated with a user. In some embodiments, the computing device can be used to communicate with another device, computer, or system. The computing device can be utilized to conduct a transaction and may be capable of conducting communications over a network. A computing device may be in any suitable form. For example, suitable computing devices can be hand-held and compact so that it can fit into a user's wallet and/or pocket (e.g., pocket-sized). The computing device can include a processor, memory, input devices, and output devices, operatively coupled to the processor. Specific examples of computing devices include cellular or mobile phones, tablet computers, desktop computers personal digital assistants (PDAs), pagers, portable computers, smart cards, and the like. Additional computing devices may include wearable devices, such as smart watches, glasses fitness bands, ankle bracelets, rings, earrings, etc. In some embodiments, the computing device may include automobiles with remote communication capabilities.

Embodiments of the present invention relate to distribution of digital assets by a transaction device. For example, a first user may distribute digital assets corresponding to a value to a plurality of recipient users based on associating the digital assets to appropriate transaction devices to be provided to the plurality of recipient users. For example, a digital asset can be associated with a transaction device by loading information (e.g., digital asset attributes) related to the digital asset, such as a value and a digital asset identifier, onto the transaction device. In another example, a digital asset can be associated with a transaction device by storing, at a server computer, a transaction device identifier corresponding to the transaction device in association with information related to the digital asset. The recipient users can then conduct a transaction using the digital asset associated with their transaction device. In some embodiments, the distribution and use of the digital assets can be managed using ledgers of transaction. In some cases, the ledgers may be unalterable electronic ledgers, which may be in the form of block chains.

In some cases, the first user may distribute a digital asset associated with a cryptocurrency value to a second user. In an exemplary case, the first user may be an employer and the second user may be an employee, where the first user may distribute wages to the second user for compensation. The first user can input an instruction into their computing device to associate a digital asset corresponding to a cryptocurrency amount with a transaction device that is to be provided to the second user. The second user can then utilize the cryptocurrency amount on the transaction device to conduct a transaction. In some embodiments, the generation and use of digital assets can be managed using ledgers that store data in the form of block chains.

Embodiments of the invention provide advantages. For example, embodiments of the invention forgo the need for consumers and resource providers to manage cash for transactions, which can be cumbersome. Accordingly, embodiments of the invention enable consumers that do not have a relationship with a financial institution (e.g., bank) to receive digital currency, as well as perform cashless transactions in a secure manner. Embodiments of the invention also enable a way for users to conveniently distribute digital assets to a plurality of recipient users, as well as easily manage information related to the distributed digital assets (e.g., recipient entities, time distributed, value distributed, etc.) without the need for physical cash. The use of cryptographic techniques to manage electronic ledgers of transactions also enables a secure system for associating digital assets with transaction devices, since data recorded in the ledgers can be configured to be unalterable. For example, any changes to the data stored in the electronic ledger cannot go undetected, since each entry in the electronic ledger is generated based on previous entries in the electronic ledger. This can make it difficult for malicious parties to inappropriately reuse a digital asset. Since multiple entities may store the unalterable electronic ledgers, this can enable an additional layer of security because the multiple entities may be requested to verify the distribution or past use of the digital asset before it is utilized.

FIG. 1 shows a block diagram showing a digital asset distribution system according to embodiments of the invention. FIG. 1 includes a digital assets service system 110, an authorization service system 120, a clearing and settlement service system 130, a distributor digital assets management system 140, a recipient digital assets management system 150, an issuer node 142, and a manager node 152. Each of these service systems may be run on a single computer or multiple systems and computers that may be in operative communication with each other via any suitable communication medium (including the Internet), using any suitable communications protocol.

For simplicity of illustration, a certain number of components are shown in FIG. 1. It is understood, however, that embodiments of the invention may include more than one of each component. In addition, some embodiments of the invention may include fewer than or greater than all of the components shown in FIG. 1. Further details related to the components shown in FIG. 1 are described with respect to other figures described herein.

Digital assets service system 110 enables digital assets to be utilized for transactions. Digital assets service system 110 may include a digital asset account management service system, which can enable management of digital assets corresponding to digital assets accounts hosted by digital assets service system 110. Digital assets service system 110 may also include service systems that enable resource providers and users to utilize services provided by digital assets service system 110. In some cases, these services may include providing applications that can enable resource providers and users to view, update, and manage information associated with digital assets that they have distributed or received.

In some cases, digital assets service system 110 can be utilized by a user (e.g., distributing user) to distribute digital assets corresponding to certain values to other users (e.g., recipient user). Accordingly, the digital asset distribution system may further include distributor digital assets management system 140 and recipient digital assets management system 150.

Distributor digital assets management system 140 enables a distributing user to distribute digital assets corresponding to certain values to recipient users. For each recipient user, distributor digital assets management system 140 can allow for a digital asset to be activated with respect to a transaction device that is to be used by the recipient user. Distributor digital assets management system 140 can also enable management of distributed digital assets based on recording information related to generated and distributed digital assets (e.g., time generated, recipient user and distributor user identification information, value, digital asset identifier, etc.). In some embodiments, distributor digital assets management system 140 may record the information using issuer node 142.

Recipient digital assets management system 150 enables recipient users to use digital assets distributed by a distributing user. Recipient digital assets management system 150 may manage digital assets associated with transaction devices that are used by recipient users. Recipient digital assets management system 150 may enable management of the digital assets based on recording information related to digital assets utilized by recipient users (e.g., time used, value used, etc.). In some embodiments, recipient digital assets management system 150 may record the information using manager node 152.

Issuer node 142 manages information related to the creation and distribution of digital assets. Issuer node 142 may generate a digital asset corresponding to a certain value upon request and record information related to the creation of the digital asset and issuance of the digital asset to a transaction device to be used by a recipient user. Issuer node 142 may manage the information by recording relevant data in a ledger of transactions. In some embodiments, the ledger of transactions may be in the form of a block chain where each new block in the block chain references previous blocks (e.g., hash of previous block) such that any tampering of data stored in these previous blocks cannot go undetected.

Manager node 152 manages information related to digital assets associated with recipient users. For example, a recipient user may use their transaction device for a transaction, wherein the transaction device is associated with a digital asset corresponding to a certain value. Manager node 152 may then record information indicating that the digital asset associated with the transaction device was utilized (e.g., time of the transaction, value utilized, participating entities, etc.). Manager node 152 can record the information in a ledger of transactions. In some embodiments, the ledger of transactions may be in the form of a block chain where each new block in the block chain references previous blocks (e.g., hash of previous block) such that any tampering of data stored in these previous blocks cannot go undetected.

In one exemplary case, the digital asset distribution system may be utilized to enable a payroll system. The distributing user may be an employer and the recipient users may be employees. The employer can activate digital assets corresponding to cryptocurrency amounts with respect to transaction devices that are to be provided to the employees for compensation. While the payroll system demonstrates one use of the digital asset distribution system, embodiments are not so limited. For example, the digital assets can correspond to other suitable values other than cryptocurrency values that may be provided from a distributing user to recipient users. Exemplary non-currency values include time limit data and access privileges data (see FIG. 6).

Figure 2:
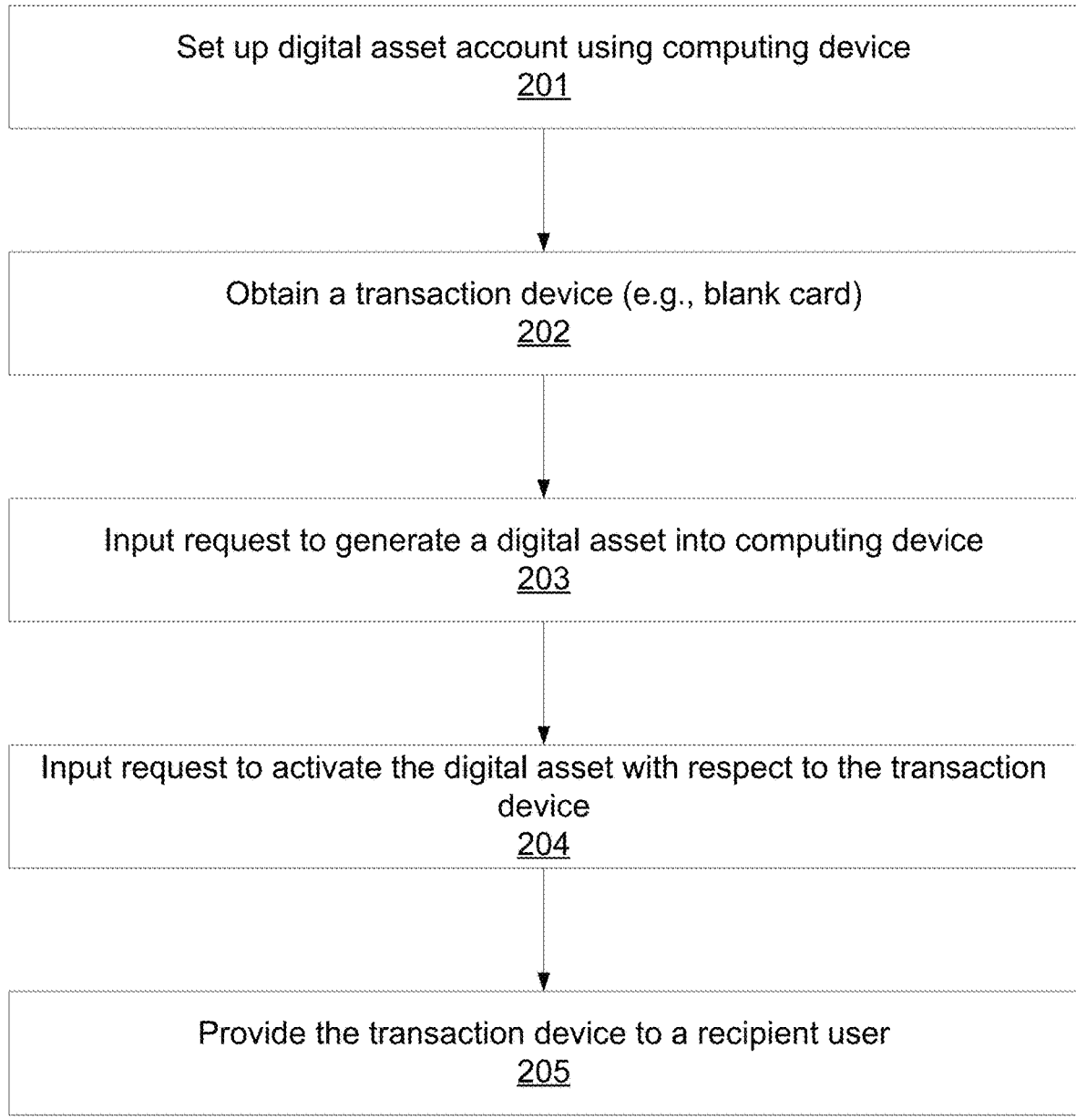
FIG. 2 shows a flow diagram of a method according to embodiments of the invention.

FIG. 2 shows a flow diagram of a method according to embodiments of the invention. The method may be performed by a distributing user. In the exemplary case described with respect to FIG. 2, the distributing user may request to generate and distribute a digital asset corresponding to a cryptocurrency value.

At step 201, the distributing user sets up a digital asset account using their computing device. The distributing user may set up their digital asset account by installing a digital asset application on their computing device. Any of the actions described as being performed by the digital asset application may be performed by a service provider computer associated with the digital asset application. The distributing user may register information, such as a name, address, and password to be associated with their digital asset account. In some embodiments, the distributing user may also register information related to their bank account (e.g., account identifier), from which amounts can be debited corresponding to cryptocurrency values associated with digital assets distributed by the distributing user. The digital asset application enables the distributing user to easily manage digital assets that it has generated and distributed.

At step 202, the distributing user obtains a transaction device. In some cases, the distributing user may request a third party to provide the transaction device. In some embodiments, the transaction device may be a card, which may initially be blank and may not have any information associated with it. It is understood that in other embodiments, the transaction device may be another suitable device that can utilized for transactions as described herein.

At step 203, the distributing user inputs a request to generate a digital asset into their computing device. The distributing user may input the request into an interface provided by the digital asset application, along with information related to the digital asset. For example, the distributing user may specify a cryptocurrency value corresponding to the digital asset. The digital asset application may then generate the digital asset according to the information input by the distributing user. In some embodiments, the digital asset application may contact a financial institution computer associated with the distributing user's bank account to ensure that it has enough funds relative to the cryptocurrency value. After generating the digital asset, the digital asset application may indicate to the distributing user that the requested digital asset was successfully generated.

At step 204, the distributing user inputs a request to activate the digital asset with respect to the transaction device. The distributing user may input the request into an interface provided by the digital asset application. In some embodiments, the activation process can be conducted using a reader device that is in communication with the computing device that is running the digital asset application. For example, the reader device may enable information to be written to the transaction device. In some cases, if the transaction device is a card and the reader device enables swipe functionality, the distributing user may swipe the transaction device using the reader device. After the transaction device is swiped, it may be provisioned with information related to the digital asset. The information may indicate a digital asset identifier (e.g., alphanumeric string) and the cryptocurrency value corresponding to the digital asset. In other embodiments, the reader device may enable use of other contact or contactless methods of transferring information that can be utilized for the activation process.

In this case, since the transaction device is being activated with a digital asset for the first time, the activation process may also include association of a transaction device identifier with the transaction device. In some embodiments, the transaction device identifier may be formatted as a card number (e.g., including an expiration date and card verification value) and may be generated by a financial institution computer that manages the funds associated with the transaction device. After the transaction device is swiped as described above, it may be provisioned with the transaction device identifier in addition to information related to the digital asset. Accordingly, the digital asset may be associated with the transaction device by the transaction device identifier.

It is understood that in other embodiments, a reader device is not needed to activate a digital asset with respect to a transaction device. For example, after the transaction device has been associated with a transaction device identifier, the distributing user can simply input a request with the transaction device identifier into the digital asset application to associate the digital asset with the transaction device. Subsequently, the backend service provider computer associated with the digital asset application may store information indicating that the digital asset is associated with the transaction device identifier. Hence, the transaction device does not have to be directly programmed to store information related to the digital asset.

At step 205, the distributing user may provide the transaction device to a recipient user. For example, the distributing user may directly deliver or mail the transaction device to the recipient user. The recipient user may receive the transaction device and utilize the transaction device to conduct a transaction up to the cryptocurrency value associated with the digital asset. The value used for the transaction may be debited from the bank account indicated by the distributing user during registration in step 201.

The distributing user may repeat steps 202 to 205 for any suitable number of recipient users. For example, if the distributing user is an employer that is distributing digital assets corresponding to cryptocurrency values to employees for compensation, the distributing user may activate digital assets with respect to each transaction device to be provided to the employees. Further details related to the generation, distribution, and utilization of digital assets are described with respect to at least FIG. 3.

While an embodiment in which the distributing user obtains a transaction device and provides the transaction device to the recipient user is described with respect to FIG. 2, embodiments are not so limited. In other embodiments, the distributing user may request to activate the digital asset with respect to a transaction device that is in possession by the recipient user. For example, the transaction device may be a mobile phone operated by the recipient user. In this case, the transaction device identifier may be any suitable identifier that can be associated with the mobile phone. For example, the transaction device identifier may be a mobile device identifier, an email address, phone number, or other suitable identifier. The distributing user can obtain the transaction device identifier (e.g., from the recipient user) and may then enter the transaction device identifier into the digital asset application on their computing device to register and identify the transaction device with which the digital asset is to be activated. In order to activate the digital asset with respect to the transaction device identifier, the backend service provider computer that manages the digital asset can then store or request other entities to store information indicating that the digital asset is associated with the transaction device identifier.

Figure 3:
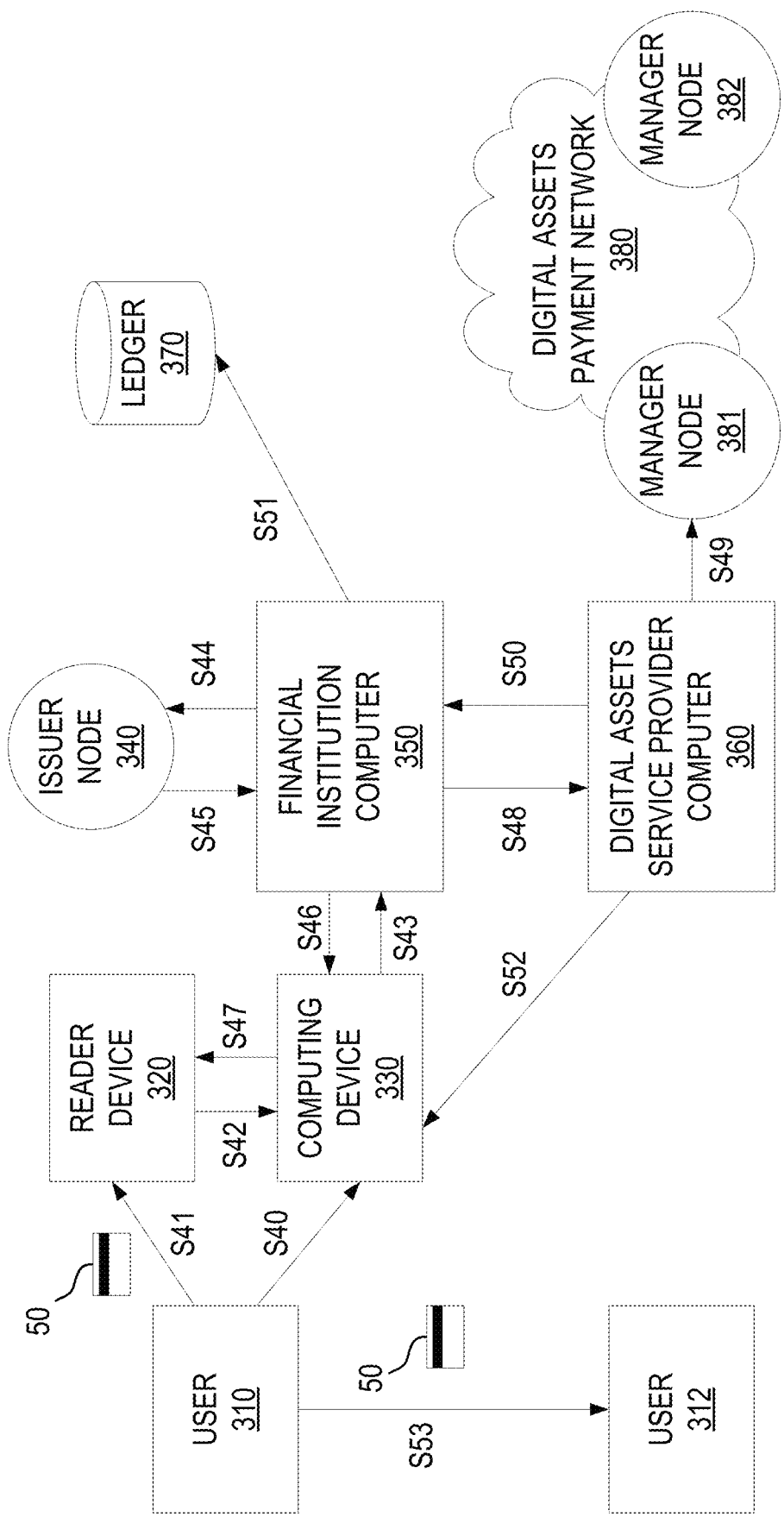
FIG. 3 shows a system with a flow diagram of distribution of a digital asset by a transaction device according to embodiments of the invention.

FIG. 3 shows a system with a flow diagram of distribution of a digital asset by a transaction device according to embodiments of the invention. FIG. 3 includes a user 310 that distributes a transaction device 50 to a user 312, a computing device 330 operated by user 310, and a reader device 320 that is in communication with computing device 330. FIG. 3 further includes an issuer node 340 and a ledger 370 that may be operated by a financial institution computer 350, a digital assets service provider computer 360, and a manager node 381 and a manager node 382 residing on a digital assets payment network 380. Financial institution computer 350 may be associated with the financial institution that hosts a bank account of user 310.

In the exemplary case described with respect to FIG. 2, user 310 is a distributing user and user 312 is a recipient user. User 310 may operate computing device 330, which runs a digital asset application through which user 310 can input requests to generate and activate digital assets. A key pair may be generated corresponding to user 310 during initial set up of the digital asset application. User 310 may obtain transaction device 50, which may be associated with a transaction device identifier as described with respect to FIG. 2. In the exemplary case, transaction device 50 may be a card. When initially provisioning transaction device 50 with a transaction device identifier using the digital asset application, a key pair associated with transaction device 50 may be generated.

At step S40, user 310 inputs into computing device 330 a request to generate a digital asset. User 310 may input the request into an interface provided by the digital asset application running on computing device 330. User 310 may provide additional information with the request, such as a cryptocurrency value to be associated with the digital asset.

At step S41, user 310 requests to activate the digital asset with respect to transaction device 50. In some embodiments, user 310 does not need to explicitly enter into computing device 330 an indication to activate the digital asset with respect to transaction device 50. For example, user 310 may simply enable information to be transferred between reader device 320 and transaction device 50 in order to request activation of the digital asset with respect to transaction device. In some cases, user 310 may enable information to be transferred between reader device 320 and transaction device 50 by swiping transaction device 50 using reader device 320, which may read the transaction device identifier associated with transaction device 50. In other embodiments, user 310 may input a request into an interface provided by the digital asset application in addition to enabling information to be transferred between reader device 320 and transaction device 50.

At step S42, reader device 320 may communicate with computing device 330. Reader device 320 may be in communication with computing device 330 by a wired connection or a wireless connection over a communication network. Reader device 320 may send the transaction device identifier to computing device 330. The digital asset application on computing device 330 may be configured so that it initiates an activation process for the digital asset with respect to transaction device 50 upon receiving the transaction device identifier from reader device 320.

At step S43, computing device 330 sends the request to generate the digital asset to financial institution computer 350. The request may be sent with information indicating the cryptocurrency value input by user 310 and the transaction device identifier associated with transaction device 50. In some cases, the request may be sent with additional information that can be used to generate the digital asset, such as identification information associated with user 310 (e.g., public key associated with user 310).

At step S44, financial institution computer 350 sends the request to issuer node 340, which generates the digital asset based on the request. In some embodiments, financial institution computer 350 may check that the bank account of user 310 has enough funds relative to the cryptocurrency value prior to sending the request to generate the digital asset. If enough funds are available, issuer node 340 may generate the digital asset based on information sent with the request. Issuer node 340 may associate the digital asset with the transaction device identifier associated with transaction device 50.

The digital asset may be data including digital asset attributes corresponding to the digital asset. For example, the digital asset attributes may include a value and a digital asset identifier. The value may be the cryptocurrency value input by user 310 and the digital asset identifier may be an identifier generated by issuer node 340 that uniquely identifies the digital asset. For example, the digital asset identifier may be a string of alphanumeric characters. In some embodiments, the digital asset may further comprise a BIN identifier, a timestamp, and identification information associated with the distributing user (e.g., public key of user 310).

At step S45, issuer node 340 sends the digital asset to financial institution computer 350. Financial institution computer 350 may then send information related to the digital asset to computing device 330 at step S46 and to digital assets service provider computer 360 at step S48 in any suitable order or in parallel.

At steps S46 and S47, information related to the generated digital asset may be sent to reader device 320 by computing device 330, which can provision the information onto transaction device 50. In some cases, the information may include certain digital asset attributes corresponding to the digital asset, such as the value, the digital asset identifier, and identification information associated with user 310. In some cases, the information may be programmed onto transaction device 50 during the same swipe conducted in step S41. In other cases, the digital asset application on computing device may be configured so that user 310 may be requested to swipe transaction device 50 another time using reader device 320, in order to provision the information onto transaction device 50.

At step S48, financial institution computer 350 forwards the information related to the digital asset to digital assets service provider computer 360. In some embodiments, digital assets service provider computer 360 may store the information related to the digital asset in association with the transaction device identifier corresponding to transaction device 50 in a database (not shown).

At step S49, digital assets service provider computer 360 communicates with manager node 381. Digital assets service provider computer 360 may look for a digital asset account associated with transaction device 50. If this is the first time that a digital asset is activated with respect to transaction device 50, the digital asset account may not exist. Digital assets service provider computer 360 may then generate the digital asset account associated with transaction device 50 and bind the digital asset account with a public address (e.g., public key) associated with transaction device 50. This enables any digital assets that are issued to transaction device 50 in the future to be associated with the digital asset account associated with transaction device 50.

Digital assets service provider computer 360 can send relevant information to manager node 381 that indicates the activation of the digital asset with respect to transaction device 50. In this case, the information can indicate at least the entity that requested generation of the digital asset (user 310) and their public address (public key), the transaction device for which the digital asset was activated (transaction device 50) and its corresponding public address (public key), the digital asset identifier, and the value (cryptocurrency value) corresponding to the digital asset. In some embodiments, transaction device 50 can be indicated by its corresponding transaction device identifier.

Digital assets service provider computer 360 may include a digital signature with the information to be sent to manager node 381. The digital signature may be generated by using the private key associated with user 310. This can allow other entities (e.g., nodes) that may access the information to verify, based on the digital signature, that user 310 requested to activate the digital asset with respect to transaction device 50. For example, the other entities can use the corresponding public key associated with user 310 to verify the digital signature and thus verify that the information is valid. This verification can ensure that the digital asset is issued to transaction device 50.

At step S50, digital assets service provider computer 360 requests financial institution computer 350 to issue the digital asset to the digital asset account associated with transaction device 50. Based on the request, financial institution computer 350 may initiate the process of updating ledger 370 to include the information received by manager node 381.

Figure 7:
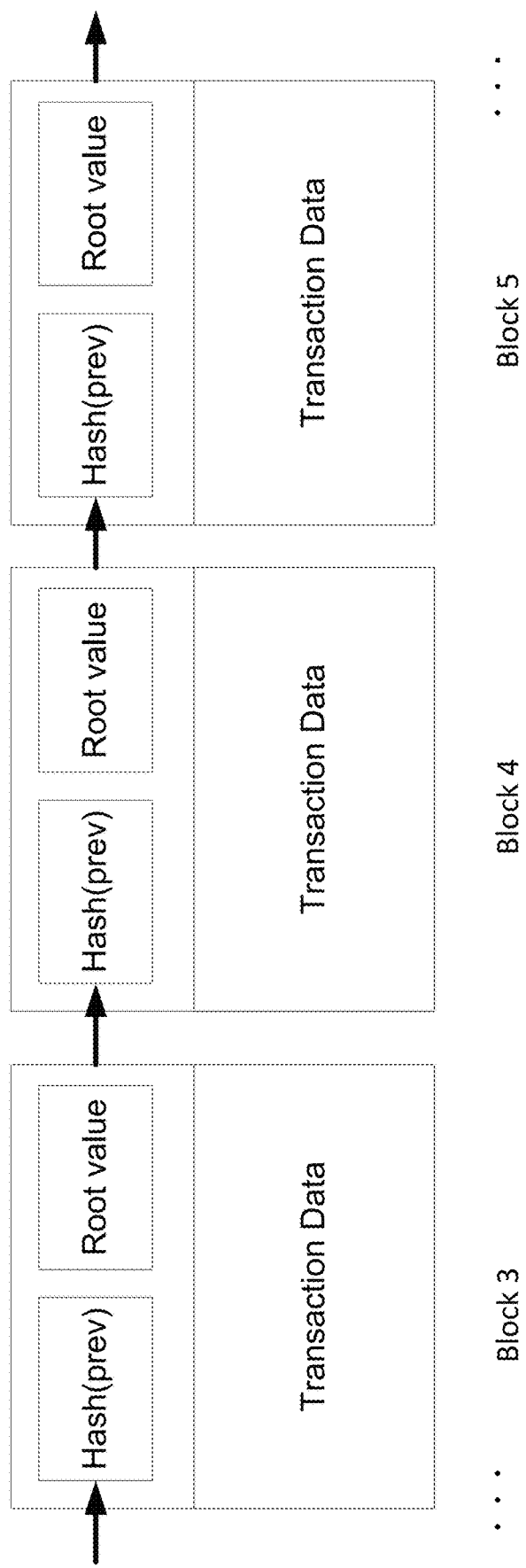
FIG. 7 shows a block diagram shows a number of entries in the form a block chain according to embodiments of the invention.

At step S51, financial institution computer 350 sends an instruction to update ledger 370. The ledger 370 may be in the form of a block chain that can be updated to include a new entry comprising the information received by manager node 381 indicating the transfer of the digital asset. In addition, the new entry may also comprise a data header that includes information that makes the new entry unalterable without detection. For example, the data header may include a hash of the previous entry in ledger 370 and a root value of all past transactions. Since each entry in ledger 370 may be generated in a similar manner by including a data header storing information referencing its previous entry and previous transactions, no entry can be modified without affecting all following entries. This ensures that any tampering of information related to transactions, such as an attempt to reassign a digital asset to an inappropriate entity, will not go unnoticed. An exemplary number of entries in the form of a block chain as described above are shown in FIG. 7.

At step S52, digital assets service provider computer 360 pushes updated information to the digital asset application running on computing device 330. The updated information may include an updated total value assigned to the digital asset account of user 310. The total value may be viewed by user 310 through an interface of the digital wallet. In this case, the updated total value can show a decrease corresponding to the cryptocurrency value of the digital asset activated with respect to transaction device 50.

After the digital asset has been activated with respect to transaction device 50 and ledger 370 has been updated, a settlement process may be performed (not shown). The settlement process may be performed between financial institution computer 350 associated with user 310 and a financial institution computer that holds money corresponding to digital assets associated with transaction device 50. The latter is described in more detail with respect to FIG. 4.

At step S53, user 310 may provide transaction device 50 to user 312. In some embodiments, user 310 may directly deliver transaction device 50 to user 312. In other embodiments, user 310 may provide transaction device 50 to user 312 using other methods, such as mailing transaction device 50. After obtaining transaction device 50, user 312 may utilize transaction device 50 to conduct a transaction using the digital asset, which is described in more detail with respect to FIG. 4.

It is understood that in some cases, the distributing user (e.g., user 310) may activate digital assets with respect to a plurality of transaction devices, where each transaction device can be provided to a different recipient user. The distributing user may perform a similar process to that described with respect to FIG. 3 for each transaction device.

It some embodiments, the distributing user may activate multiple digital assets with respect to a single transaction device. The multiple digital assets can be activated at different times. In some cases, the distributing user may activate a new digital asset with respect to the transaction device after certain time intervals. For example, the distributing user may be an employer that activates a new digital asset in regular time intervals corresponding to a salary period for a recipient user. In this case, the recipient user may use their transaction device to conduct transactions in between the salary periods. At the beginning of a new salary period, the recipient user may provide their transaction device to the distributing user to request activation of a new digital asset. The distributing user may perform a similar process to that described with respect to FIG. 3 to activate the new digital asset with respect to the transaction device. In some embodiments, the recipient user does not have to provide their transaction device to the distributing user, since the distributing user can simply indicate the transaction device identifier associated with the transaction device to the digital assets service provider computer when activating a new digital asset.

In some cases, some digital assets previously activated with respect to the transaction device may still have value and thus the recipient user may then be able to use the remaining value corresponding to the previously activated digital assets, as well as the value corresponding to the new digital asset. The transaction device may thus store information related to multiple digital assets.

Figure 4:
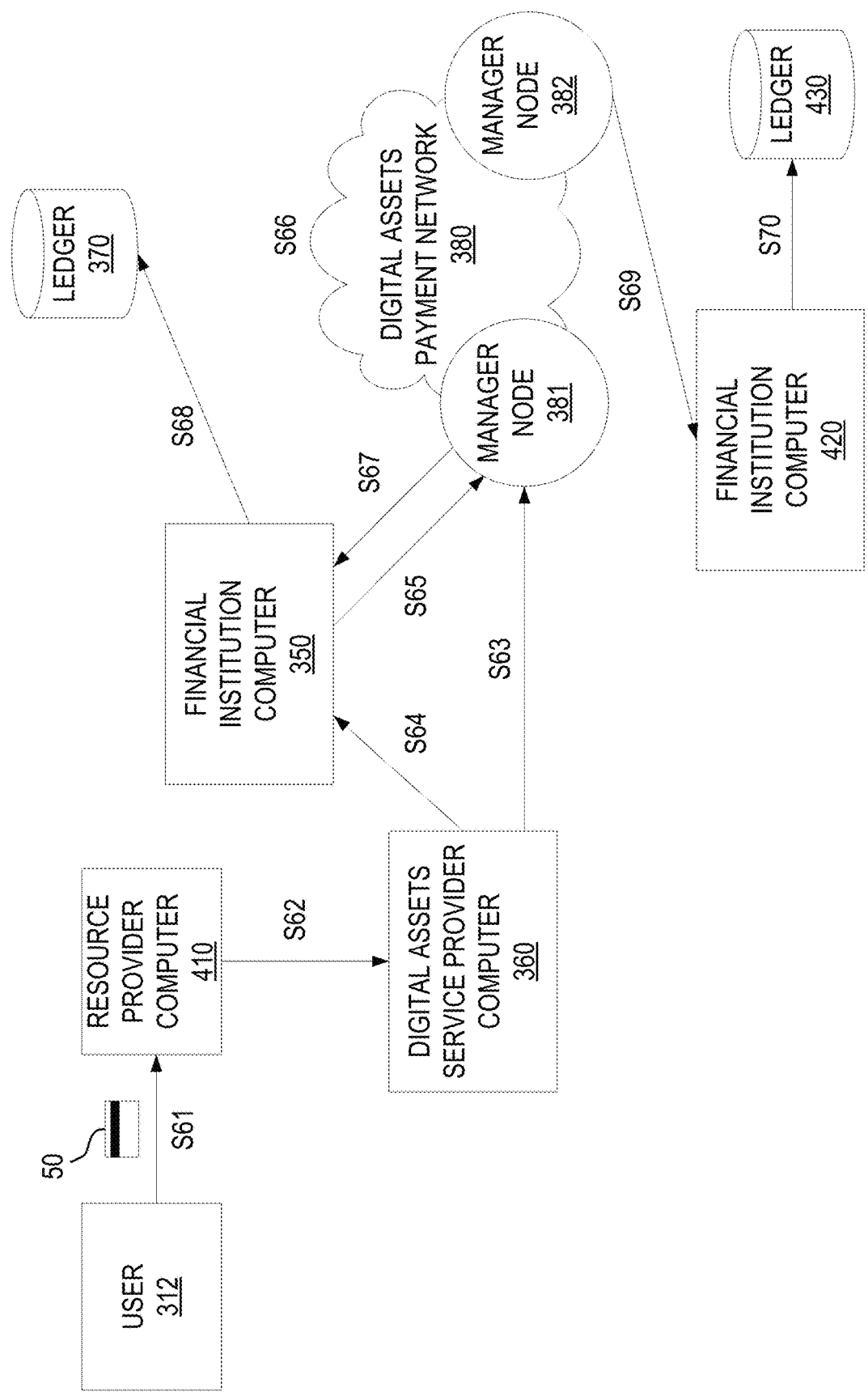
FIG. 4 shows a system with a flow diagram of use of a digital asset associated with a transaction device according to embodiments of the invention.

FIG. 4 shows a system with a flow diagram of use of a digital asset associated with a transaction device according to embodiments of the invention. FIG. 4 includes some components of FIG. 3. FIG. 4 also includes a resource provider computer 410, a financial institution computer 420 and a ledger 430. Resource provider computer 410 may be associated with a resource provider with which user 312 conducts a transaction. Resource provider computer 410 may be set up with a digital asset account so that it can support payment using digital assets. As described above with respect to FIG. 3, financial institution computer 350 may be associated with the financial institution that hosts a bank account of the distributing user (user 310 of FIG. 3).

Financial institution computer 420 may be associated with any suitable financial institution that can hold money corresponding to cryptocurrency values associated with transaction device 50. In some cases, the financial institution associated with financial institution computer 420 may have a relationship with a payment processor associated with digital assets service provider computer 360. For example, the financial institution may have a partnership with the financial institution that allows financial institution computer 420 to hold money corresponding to cryptocurrency values associated with transaction device 50. In other embodiments, financial institution computer 420 may be associated with the same financial institution as that associated with financial institution computer 350.

At step S61, user 312 may use transaction device 50 to conduct the transaction with resource provider computer 410. User 312 may utilize transaction device 50 at a point-of-sale terminal of resource provider computer 410. For example, user 312 may swipe transaction device 50 at an access device (not shown), which may send information read from transaction device 50 to resource provider computer 410. As described with respect to FIG. 3, the information may include certain digital asset attributes corresponding to the digital asset activated with respect to transaction device 50, such as the value, the digital asset identifier, and identification information associated with the distributing user (user 310 of FIG. 3). Additionally, the information may include the transaction device identifier associated with transaction device 50.

At steps S62 and S63, resource provider computer 410 sends the information read from transaction device 50 (see S61) to digital assets service provider computer 360, which then requests verification of balances in the digital asset account corresponding to transaction device 50. Digital assets service provider computer 360 may determine a manager node associated with the received identification information associated with user 310, which in this case may be manager node 381. Digital assets service provider computer 360 may then request manager node 381 to verify that the digital asset was activated with respect to transaction device 50.

Manager node 381 may verify that the digital asset was activated with respect to transaction device 50 by confirming that that the digital asset is issued to the public address bound to the digital asset account corresponding to transaction device 50. Upon confirmation, manager node 381 may notify digital assets service provider computer 360 that the digital asset is indeed associated with transaction device 50. This allows digital assets service provider computer 360 to also verify the balance associated with transaction device 50 and ensure that the balance is at least equal to the transaction amount of the current transaction.

At step S64, digital assets service provider computer 360 requests financial institution computer 350 to initiate the process for recording data related to the current transaction. Specifically, digital assets service provider computer 360 may request financial institution computer 350 to build, sign, and submit the transaction data related to the current transaction. In some embodiments, the transaction data can indicate at least the entity that distributed the digital asset (user 310 in FIG. 3) and their public address (public key), the transaction device to which the digital asset was activated (transaction device 50) and their public address (public key), and the digital asset identifier corresponding to the digital asset. Transaction device 50 may be indicated by its corresponding transaction device identifier.

Additionally, the transaction data can also indicate the value of the digital asset utilized for the transaction. For example, if the transaction amount uses the full cryptocurrency value associated with the digital asset, the transaction data may indicate that the full value of the digital asset is now assigned to resource provider computer 410 instead of transaction device 50. In another example, if the full cryptocurrency value associated with the digital asset is not utilized for the transaction, the value of the digital asset can be split. In this case, the transaction data may indicate how much of the value is assigned to the digital asset account of resource provider computer 410 and how much of the value is to be remain associated with transaction device 50 as a result of the transaction.

Financial institution computer 350 may fetch a private key to use to digitally sign the transaction data. The private key may be associated with the digital asset that is being used to pay for the transaction. The private key may have been generated along with a corresponding public key when the digital asset was first generated by issuer node 340 (see FIG. 3) and stored by financial institution computer 350.

At steps S65 and S66, financial institution computer 350 submits the signed transaction data to manager node 381, which then triggers other manager nodes residing on digital assets payment network 380 to contact entities that maintain ledgers to update their ledgers with the new transaction data. By communicating the update to other nodes residing on digital assets payment network 380, this ensures that any entity maintaining a ledger can verify the authenticity of the transaction. For example, the digital signature included with the submitted transaction data can be verified by using the corresponding public key, which is made publicly available.

At steps S67 and S68, manager node 381 sends an instruction to update their ledger to financial institution computer 350, which then updates ledger 370 with the new transaction data. Ledger 370 may be in the form of a block chain and the new transaction data can be stored in a new entry. The new entry may also comprise a data header that includes information that makes the new entry unalterable without detection. For example, the data header may include a hash of the previous entry in ledger 370 and a root value calculated based on all past transaction data. Since each entry in ledger 370 may be generated in a similar manner by including a data header storing information referencing its previous entry and previous transactions, no entry can be modified without affecting all following entries. This ensures that any tampering of information related to transactions, such as an attempt reassign a digital asset to an inappropriate entity, will not go unnoticed. An exemplary number of entries in the form of a block chain as described above are shown in FIG. 7.

At steps S69 and S70, manager node 382 sends an instruction to update their ledger to financial institution computer 420, which then updates ledger 430 with the new transaction data. Similarly to ledger 370, ledger 430 may be in the form of a block chain and the new transaction data can be stored in a new entry. The new entry may also comprise a data header that includes information that makes the new entry unalterable without detection. For example, the data header may include a hash of the previous entry in ledger 430 and a root value calculated based on all past transactions. Since each entry in ledger 430 may be generated in a similar manner by including a data header storing information referencing its previous entry and previous transactions, no entry can be modified without affecting all following entries. This ensures that any tampering of information related to transactions, such as an attempt reassign a digital asset to an inappropriate entity, will not go unnoticed. An exemplary number of entries in the form of a block chain as described above are shown in FIG. 7.

At the end of the day, a settlement process may be performed. Specifically, the settlement process may result in moving the transaction amount from the ACH (automated clearing house) account associated with transaction device 50 hosted by financial institution computer 420 to the ACH account associated with resource provider computer 410 with which user 312 performed the transaction.

While an embodiment in which a single digital asset is utilized for the transaction is described in detail above, embodiments are not so limited. In some embodiments, the transaction device can store information associated with multiple digital assets activated with respect to the transaction device. In this case, the access device may read information stored by the transaction device related to all of its corresponding digital assets and send the information to the digital assets service provider computer. The digital assets service provider computer may then determine an appropriate set of digital assets that can be utilized to pay for the transaction. If multiple digital assets are utilized for the transaction, the digital assets service provider computer may indicate in the transaction data sent to the financial institution computers managing ledgers the information identifying each digital asset used (e.g., digital asset identifier) and the value used towards the transaction for each digital asset.

Embodiments of the invention advantageously enable convenient systems and methods for distributing wages. A distributing user does not have to manage and distribute cash, since they can easily load digital assets to transaction devices at convenient times. Further, the distributing user can track their previously distributed digital assets using their digital asset application, which is useful when activating, especially at different times, digital assets with respect to transaction devices for a plurality of recipient users. Paying for a transaction using a transaction device associated with digital assets is also a convenient process for a recipient user. The recipient user does not have to create any account to use digital assets associated with the transaction device in cashless transactions. In addition, the transaction device is compatible with typical transaction processing systems, so no further setup processes are needed by the recipient user. If the recipient user does want to track the value remaining corresponding to their transaction device, they can simply query the digital assets service provider computer by providing the transaction device identifier directly (e.g., by digital asset application) or through an intermediate entity (e.g., resource provider computer, payment processing server computer, etc.).

Figure 5:
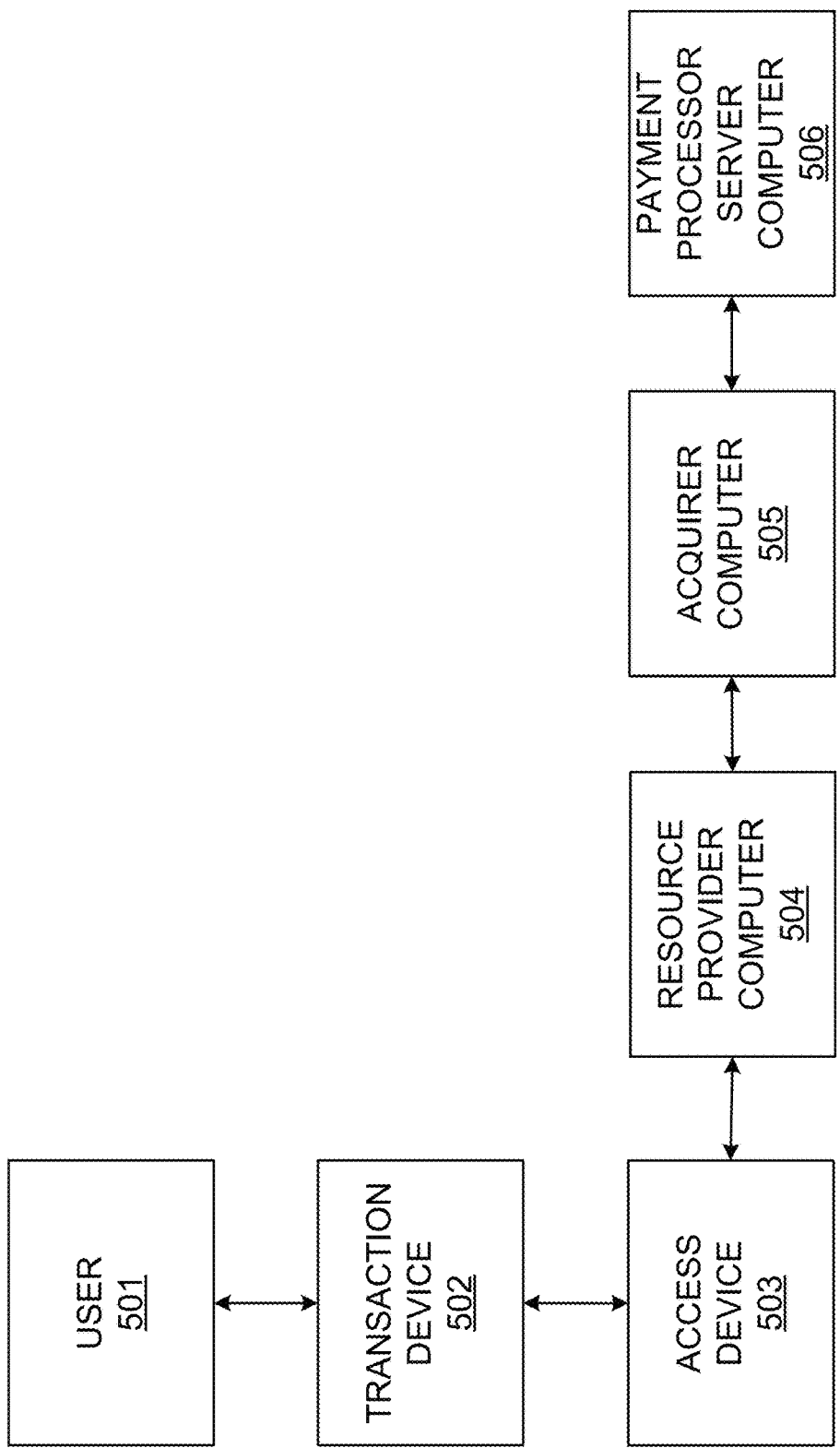
FIG. 5 shows a block diagram of a system according to embodiments of the invention.

FIG. 5 shows a block diagram of an exemplary system with at least some of the components for implementing embodiments of the invention. FIG. 5 describes in more detail entities that may be involved in processing a financial transaction such as that described with respect to FIG. 4. FIG. 5 includes a user 501, a transaction device 502, access device 503, a resource provider computer 504, an acquirer computer 505, and a payment processor server computer 506.

Any of the computing devices (e.g., transaction device 502, access device 503, resource provider computer 504, acquirer computer 505, payment processor server computer 506) may include a processor and a computer readable medium comprising code, executable by the processor for performing the functionality described herein. Further, any of the computing devices may be in communication by any suitable communications network.

The communications network may comprise a plurality of networks for secure communication of data and information between entities. In some embodiments, the communications network may follow a suitable communication protocol to generate one or more secure communication channels. Any suitable communications protocol may be used for generating a communications channel. A communication channel may in some instances comprise a "secure communication channel," which may be established in any known manner, including the use of mutual authentication and a session key and establishment of an SSL session. However, any method of creating a secure channel may be used. By establishing a secure channel, sensitive information may be securely transmitted to facilitate a transaction.

User 501 (which may also be known as a consumer) may operate transaction device 502. User 501 may be a recipient user, where another distributing user activates digital assets with respect to transaction device 502. In some embodiments, user 501 may receive transaction device 502 from the distributing user.

Transaction device 502 may be any suitable device to conduct a transaction. In some embodiments, transaction device 502 may be a transaction card, which may be programmable. In other embodiments, transaction device 502 may be a computing device that includes a memory. Transaction device 502 may communicate over a communications network with one or more entities (e.g., access device 503, resource provider computer 504, payment processor server computer, etc.). Transaction device 502 may be capable of communicating with access device 503. In some embodiments, transaction device 502 may be capable of communicating by contact or wirelessly with access device 503. In other cases, transaction device 502 may be utilized in a card-not-present transaction, such as through a website. Some non-limiting examples of transaction device 502 include mobile devices (e.g., cellular phones, keychain devices, personal digital assistants (PDAs), pagers, notebooks, laptops, notepads, smart watches, fitness bands, jewelry, etc.), automobiles with remote communication capabilities, personal computers, payment cards (e.g., smart cards, magnetic stripe cards, etc.), and the like.

Access device 503 may be any suitable device that provides access to a remote system. Access device 503 may also be used for communicating with a resource provider compute (e.g., resource provider computer 504), a transaction processing computer, an authentication computer, or any other suitable system. Access device 503 can be located in any suitable location, such as at the location of the resource provider associated with resource provider computer 504. Access device 503 may be in any suitable form. Some examples of access devices include POS or point of sale devices (e.g., POS terminals), cellular phones, PDAs, personal computers (PCs), tablet PCs, hand-held specialized readers, set-top boxes, electronic cash registers (ECRs), automated teller machines (ATMs), virtual cash registers (VCRs), kiosks, security systems, access systems, and the like.

Access device 503 may use any suitable contact or contactless mode of operation to send or receive data from, or associated with, transaction device 502. In some embodiments, where access device 503 comprises a POS terminal, any suitable POS terminal may be used and may include a reader, a processor, and a computer-readable medium. A reader may include any suitable contact or contactless mode of operation. For example, exemplary card readers can include radio frequency (RF) antennas, optical scanners, bar code readers, or magnetic stripe readers to interact with a payment device and/or mobile device. In some embodiments, a cellular phone, tablet, or other dedicated wireless device used as a POS terminal may be referred to as a mobile point of sale or an "mPOS" terminal.

Resource provider computer 504 (also known as a merchant computer) may be configured to receive and process transaction data. In some embodiments, the transaction data may be received from transaction device 502 or access device 503 in communication with transaction device 502. Resource provider computer 504 may engage in transactions, sell goods or services, or provide access to goods or services to the consumer. Resource provider computer 504 may accept multiple forms of payment and may use multiple tools to conduct different types of transactions. For example, resource provider computer 504 may sell goods and/or services via a website or application, and may accept payments over the Internet. Resource provider computer 504 may also be associated with a physical store that utilizes access device 503 for in-person transactions.

Acquirer computer 505 may be a system or an entity (e.g., a bank) that has a business relationship with resource provider computer 504. Acquirer computer 505 may manage funds associated with resource provider computer 504. Acquirer computer 505 may route authorization requests for transactions to payment processor server computer 506.

Payment processor server computer 506 may include data processing subsystems, networks, and operations used to support and deliver authorization services, and clearing and settlement services. Payment processor server computer 506 may be associated with a payment processing network. An example of a payment processing network includes VisaNet®, operated by Visa®. The payment processing network may include wired or wireless network, including the internet. In some embodiments, payment processor server computer 506 may also operate a digital assets service provider computer. As described with respect to FIG. 4, the digital assets service provider computer may be in communication with one or more financial institution computers.

While embodiments of the invention utilized in financial contexts are described in detail above, embodiments are not so limited. For example, digital assets may correspond to non-currency values, such as time values, access privilege values, and other suitable values, which can be activated with respect to a transaction device to be used by a recipient user. An exemplary case is described with respect to FIG. 6.

Figure 6:
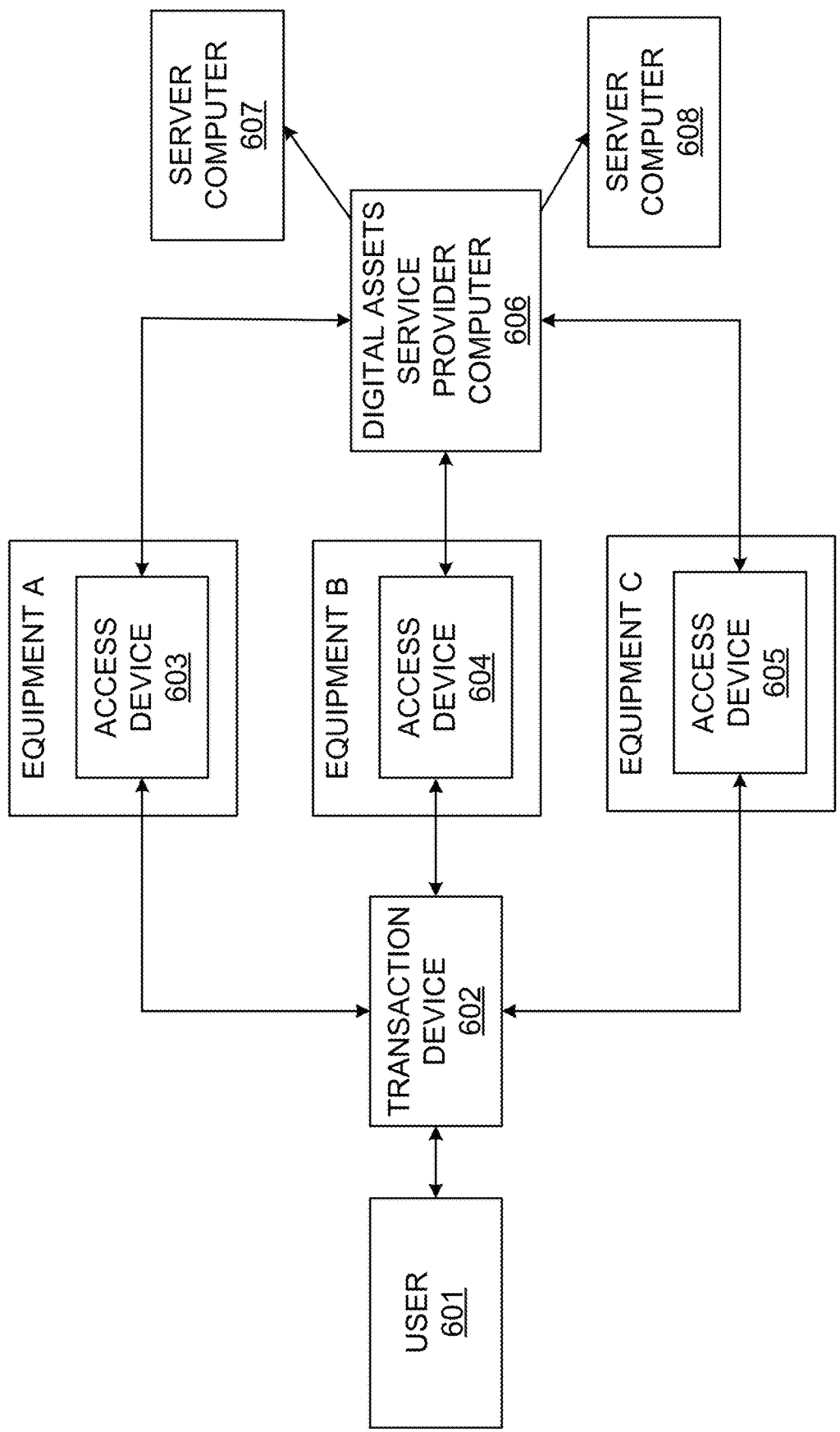
FIG. 6 shows a block diagram of a non-financial system according to embodiments of the invention.

FIG. 6 shows a block diagram of a non-financial system according to embodiments of the invention. FIG. 6 includes a user 601, a transaction device 602, access devices 603, 604, and 605, a digital assets service provider computer 606, a server computer 607, and a server computer 608. In this exemplary case, a distributing user (not shown) may provide transaction device 602 to user 601, a recipient user. Prior to providing transaction device 602 to user 601, the distributing user can activate a digital asset with respect to transaction device 602 in a similar manner to that described at least with respect to FIG. 3. However, in this case, the digital asset may correspond to a non-currency value, such as an access privileges value. The access privileges value may indicate the number of times that the distributing user allows for user 601 to use various pieces of equipment. For example, the digital asset may indicate that user 601 can access any of equipment A, equipment B, and equipment C for a total of ten usages. Hence, by providing transaction device 602 to user 601, the distributing user can enable user 601 to use the equipment for a specified number of uses corresponding to the activated digital asset. The use of the digital asset activated with respect to transaction device 602 is described below. Some steps may be described in further detail with respect to corresponding steps described for FIG. 4.

After receiving transaction device 602, user 601 can utilize transaction device 602 to access equipment as enabled by the digital asset. The equipment may be configured so that a user can access the equipment based on communicating with an access device using transaction device 602. For example, when user 601 wants to utilize equipment A, user 601 may swipe transaction device 602 using access device 603 associated with equipment A. Similarly, user 601 may swipe transaction device 602 using access device 604 to utilize equipment B and swipe transaction device 602 using access device 605 to utilize equipment C. It is understood that access devices 603, 604, and

605 may support other methods of contact and contactless communication that are compatible with transaction device 602. Each of access devices 603, 604, and 605 may be in communication with digital assets service provider computer 606.

In an exemplary case, user 601 may swipe transaction device 602 using access device to utilize equipment A. Access device 603 can read information related to digital assets activated with respect to transaction device 602. In this case, access device 603 may read that the digital asset previously activated by the distributing user is associated with transaction device 602 and corresponding to a value of ten usages. Access device 603 may send information related to the digital asset read from transaction device 602 to digital assets service provider computer 606. In some embodiments, the information may include the digital asset identifier corresponding to the digital asset, the transaction device identifier associated with transaction device 602, and identification information associated with the distributing user of the digital asset.

Digital assets service provider computer 606 may then communicate with server computer 607 and server computer 608. Server computer 607 may be associated with the distributing user and may manage digital assets distributed by the distributing user. Server computer 607 can manage a ledger (not shown) that records information related to digital assets distributed by the distributing user. Server computer 608 may be associated with an entity (e.g., owner) that wants to track usage of equipment A. In some embodiments, server computer 608 may also be associated with equipment B and equipment C. Server computer 608 can manage a ledger (not shown) that records information related to usage of digital assets with respect to equipment A, B, and C.

Digital assets service provider computer 606 may communicate with server computer 607 to verify details related to the digital asset. Digital assets service provider computer 606 may request server computer 607 to verify that the digital asset used by user 601 was previously activated with respect to transaction device 602. Server computer 607 can then verify the digital asset based on checking their ledger for an indication that the digital asset was indeed distributed by the distributing user and activated with respect to transaction device 602. Server computer 607 may also verify that there remains value associated with the digital asset (e.g., not all ten usages have been used). Server computer 607 may indicate to digital assets service provider computer 606 that the digital asset is verified.

Subsequently, digital assets service provider computer 606 may request server computer 607 and server computer 608 to update their ledgers to indicate the use of the digital asset corresponding to transaction device 602. In some embodiments, digital assets service provider computer 606 may build transaction data including information related to the digital asset (e.g., digital asset identifier, distributing user identification information) and the transaction device identifier associated with transaction device 602. The transaction data can also indicate that equipment A was utilized for one usage, bringing the value associated with the digital asset to a total of nine remaining usages of the equipment. Digital assets service provider computer 606 may send the transaction data to server computer 607 and server computer 608, which can update their ledgers with the transaction data. This ensures that the involved entities each have a record of the remaining usages corresponding to the digital asset associated with transaction device 602. The entities can use this information during subsequent transactions to determine whether transaction device 602 is valid for further usage with the equipment.

As described herein, the ledgers managed by server computer 607 and server computer 608 may be in the form of block chains. A new entry in a ledgers can comprise a data header that includes information that makes the new entry unalterable without detection. For example, the data header may include a hash of the previous entry in the ledger and a root value of all past transactions. Since each entry in the ledger may be generated in a similar manner by including a data header storing information referencing its previous entry and previous transactions, no entry can be modified without affecting all following entries. This ensures that any tampering of information related to transactions, such as an attempt to reassign a digital asset to an inappropriate entity, will not go unnoticed. An exemplary number of entries in the form of a block chain as described above are shown in FIG. 7.

Embodiments of the invention enable advantages. For example, the distributor can provide user 601 with access privileges, even though user 601 may not have a relationship with digital assets service provider computer 606 or server computer 608. This is convenient, since user 601 does not have to take the time to sign up for an account. Additionally, user 601 may only need to access the equipment temporarily (e.g., for a limited number of times), in which case generating an account can waste computing resources utilized towards storing account data. Further, since server computers 607 and 608 maintain ledgers that record information related to past transactions, this enables multiple entities to verify the digital asset provided to and used by user 601. This provides additional layers of security, since it makes it difficult for user 601 to misuse (e.g., overuse) access privileges for the equipment.

A computer system may be utilized to implement any of the entities or components described above. Subsystems of the computer system may be interconnected via a system bus. Additional subsystems may include a printer, a keyboard, a fixed disk (or other memory comprising computer readable media), a monitor, which is coupled to a display adapter, and others. Peripherals and input/output (I/O) devices, which couple to an I/O controller (which can be a processor or other suitable controller), can be connected to the computer system by any number of means known in the art, such as by a serial port. For example, the serial port or external interface can be used to connect the computer apparatus to a wide area network such as the Internet, a mouse input device, or a scanner. The interconnection via system bus allows the central processor to communicate with each subsystem and to control the execution of instructions from system memory or the fixed disk, as well as the exchange of information between subsystems. The system memory and/or the fixed disk may embody a computer readable medium. In some embodiments, the monitor may be a touch sensitive display screen.

Specific details regarding some of the above-described aspects are provided above. The specific details of the specific aspects may be combined in any suitable manner without departing from the spirit and scope of embodiments of the technology. For example, back end processing, data analysis, data collection, and other transactions may all be combined in some embodiments of the technology. However, other embodiments of the technology may be directed to specific embodiments relating to each individual aspect, or specific combinations of these individual aspects.

It should be understood that the present technology as described above can be implemented in the form of control logic using computer software (stored in a tangible physical medium) in a modular or integrated manner. While the present invention has been described using a particular combination of hardware and software in the form of control logic and programming code and instructions, it should be recognized that other combinations of hardware and software are also within the scope of the present invention. Based on the disclosure and teachings provided herein, a person of ordinary skill in the art will know and appreciate other ways and/or methods to implement the present technology using hardware and a combination of hardware and software Any of the software components or functions described in this application, may be implemented as software code to be executed by a processor using any suitable computer language such as, for example, Java, C++ or Perl using, for example, conventional or object-oriented techniques. The software code may be stored as a series of instructions, or commands on a computer readable medium, such as a random access memory (RAM), a read only memory (ROM), a magnetic medium such as a hard-drive or a floppy disk, or an optical medium such as a CD-ROM. Any such computer readable medium may reside on or within a single computational apparatus, and may be present on or within different computational apparatuses within a system or network.

The above description is illustrative and is not restrictive. Many variations of the technology will become apparent to those skilled in the art upon review of the disclosure. The scope of the technology should, therefore, be determined not with reference to the above description, but instead should be determined with reference to the pending claims along with their full scope or equivalents.

In some embodiments, any of the entities described herein may be embodied by a computer that performs any or all of the functions and steps disclosed.

One or more features from any embodiment may be combined with one or more features of any other embodiment without departing from the scope of the technology.

A recitation of "a", "an" or "the" is intended to mean "one or more" unless specifically indicated to the contrary.

All patents, patent applications, publications, and descriptions mentioned above are herein incorporated by reference in their entirety for all purposes. None is admitted to be prior art.

What is claimed is:

1. A method comprising:
   receiving, by a computing device from a first user, a request to generate a digital asset, the request comprising a cryptocurrency value, a transaction device identifier of a transaction device, and identification information of the first user, the identification information comprising a public key;
   sending, by the computing device, the request to generate the digital asset to a first financial institution computer, the first financial institution computer thereafter generating the digital asset comprising the cryptocurrency value, a digital asset identifier identifying the digital asset, and the identification information of the first user that comprises the public key;
   receiving, by the computing device from the first financial institution computer, the digital asset associated with the transaction device identifier of the transaction device; and
   providing, by the computing device, the digital asset to a reader device, the reader device thereafter programming the digital asset onto the transaction device,
   wherein the first financial institution computer provides the digital asset to a service provider computer to activate the digital asset with respect to the transaction device to be provided to a second user, and
   wherein the method further comprises:
      in response to receiving the digital asset, (i) sending by the service provider computer the digital asset to a manager node associated with a digital assets payment network, to obtain a digital asset account associated with the transaction device, and (ii) sending, to the first financial institution computer, a request to issue the digital asset to the digital asset account associated with the transaction device and to update a first unalterable electronic ledger associated with the first financial institution computer to indicate the association of the digital asset with the transaction device, thereby making the digital asset, which is programmed onto the transaction device, available to the second user-utilizes;
      in response to receiving, by the service provider computer, an indication that the second user utilized the transaction device comprising the digital asset to conduct a transaction, the indication comprising at least the digital asset identifier and the public key, sending by the service provider computer a request to the first financial institution computer to sign transaction data associated with the transaction with a private key; and
      in response to the transaction data being signed, sending, by the service provider computer via the manager node to a second financial institution computer associated with the digital assets payment network, a request to update a second unalterable electronic ledger associated with the second financial institution computer to indicate the use of the digital asset by the second user, and sending, to the first financial institution computer, a request to update the first unalterable electronic ledger associated with the first financial institution computer to indicate the use of the digital asset by the second user.

2. The method of claim 1, wherein the transaction device includes a card.

3. The method of claim 1, wherein, in response to the request to update the first unalterable electronic ledger, the first financial institution computer updates the first unalterable electronic ledger.

4. The method of claim 3, wherein, in response to the request to update the second unalterable electronic ledger, the second financial institution computer updates the second unalterable electronic ledger.

5. The method of claim 1, wherein each of the first unalterable electronic ledger and the second unalterable electronic ledger includes a block chain.

6. The method of claim 1, wherein the transaction device includes a mobile device.

7. A computer system comprising:
   a service provider computer; and
   a computing device comprising a first processor; and a first computer readable medium coupled to the first processor, the first computer readable medium comprising first code that, when executed by the first processor, causes the first processor to perform a first method including:
      receiving, from a first user, a request to generate a digital asset, the request comprising a cryptocurrency value, a transaction device identifier of a transaction device, and identification information of the first user, the identification information comprising a public key;

sending the request to generate the digital asset to a first financial institution computer, the first financial institution computer thereafter generating the digital asset comprising the cryptocurrency value, a digital asset identifier identifying the digital asset, and the identification information of the first user that comprises the public key;

receiving, from the first financial institution computer, the digital asset associated with the transaction device identifier of the transaction device; and providing the digital asset to a reader device, the reader device thereafter programming the digital asset onto the transaction device, wherein the first financial institution computer provides the digital asset to the service provider computer to activate the digital asset with respect to the transaction device to be provided to a second user, wherein the service provider computer comprises a second processor and a second computer readable medium coupled to the second processor, the second computer readable medium comprising second code that, when executed by the second processor, causes the second processor to perform a second method including:

in response to receiving the digital asset, (i) sending digital asset to a manager node associated with a digital assets payment network, to obtain a digital asset account associated with the transaction device, and (ii) sending, to the first financial institution computer, a request to issue the digital asset to the digital asset account associated with the transaction device and to update a first unalterable electronic ledger associated with the first financial institution computer to indicate the association of the digital asset with the transaction device, thereby making the digital asset, which is programmed onto the transaction device, available to the second user;

in response to receiving an indication that the second user utilized the transaction device comprising the digital asset to conduct a transaction, the indication comprising at least the digital asset identifier and the public key, sending a request to the first financial institution computer to sign transaction data associated with the transaction with a private key; and in response to the transaction data being signed, sending, via the manager node to a second financial institution computer associated with the digital assets payment network, a request to update a second unalterable electronic ledger associated with the second financial institution computer to indicate the use of the digital asset by the second user, and sending, to the first financial institution computer, a request to update the first unalterable electronic ledger associated with the first financial institution computer to indicate the use of the digital asset by the second user.

8. The computer system of claim 7, wherein the transaction device includes a card.

9. The computer system of claim 7, wherein, in response to the request to update the first unalterable electronic, the first financial institution computer updates the first unalterable electronic ledger.

10. The computer system of claim 9, wherein, in response to the request to update the second unalterable electronic ledger, the second financial institution computer updates the second unalterable electronic ledger.

11. The computer system of claim 7, wherein each of the first unalterable electronic ledger and the second unalterable electronic ledger includes a block chain.

12. The computer system of claim 7, wherein the transaction device includes a mobile device.

* * * * *

UNITED STATES PATENT AND TRADEMARK OFFICE
CERTIFICATE OF CORRECTION

PATENT NO. : 12,062,039 B2
APPLICATION NO. : 18/172216
DATED : August 13, 2024
INVENTOR(S) : Sivanarayana Gaddam, Gyan Prakash and John Arendt It is certified that error appears in the above-identified patent and that said Letters Patent is hereby corrected as shown below:

In the Claims

In Claim 1, Column 22, Line 22, please remove "available to the second user-utilizes;" and insert -- available to the second user; --

In Claim 9, Column 24, Line 26, please remove "update the first unalterable electronic," and insert -- update the first unalterable electronic ledger, --

Signed and Sealed this
Eighth Day of October, 2024

Katherine Kelly Vidal
*Director of the United States Patent and Trademark Office*